United States Patent
Knab

(10) Patent No.: US 10,668,355 B2
(45) Date of Patent: Jun. 2, 2020

(54) SIGNALING DEVICE AND APPARATUS

(71) Applicant: Niklas Knab, Köln (DE)

(72) Inventor: Niklas Knab, Köln (DE)

( * ) Notice: Subject to any disclaimer, the term of this patent is extended or adjusted under 35 U.S.C. 154(b) by 2 days.

(21) Appl. No.: 16/083,657

(22) PCT Filed: Mar. 9, 2017

(86) PCT No.: PCT/DE2017/100189
§ 371 (c)(1),
(2) Date: Sep. 10, 2018

(87) PCT Pub. No.: WO2017/152914
PCT Pub. Date: Sep. 14, 2017

(65) Prior Publication Data
US 2019/0126126 A1 May 2, 2019

(30) Foreign Application Priority Data

Mar. 11, 2016 (DE) .......................... 10 2016 003 067
Oct. 13, 2016 (DE) .......................... 10 2016 119 546

(51) Int. Cl.
*A63F 9/00* (2006.01)
*A63B 71/06* (2006.01)
(Continued)

(52) U.S. Cl.
CPC ...... *A63B 71/0622* (2013.01); *A63B 69/3608* (2013.01); *A63B 69/3632* (2013.01);
(Continued)

(58) Field of Classification Search
None
See application file for complete search history.

(56) References Cited

U.S. PATENT DOCUMENTS

| 5,340,102 | A  |   | 8/1994  | Adamson |
| 6,645,083 | B1 | * | 11/2003 | Armstrong, III .... A63B 15/005 473/224 |

(Continued)

FOREIGN PATENT DOCUMENTS

| DE | 37 41 927 A1 | 7/1988 |
| GB | 2200234 A    | 7/1988 |

(Continued)

OTHER PUBLICATIONS

International Search Report for corresponding App. No. PCT/DE2017/100189, dated Jul. 10, 2017.

*Primary Examiner* — Seng H Lim
(74) *Attorney, Agent, or Firm* — Renner, Otto, Boisselle & Sklar, LLP

(57) ABSTRACT

A signaling device, and in particular a signaling device for a striking implement such as a tennis racket, a golf club or the like, for generating signals during a movement of the signaling device (10), including a resonant body and a holding device, wherein the resonant body and the holding device are to be connected to one another or connectable to one another, so as to attach the resonant body by way of the holding device to a striking implement or the like, wherein the resonant body furthermore includes a cavity for generating an acoustic signal during a movement, wherein the resonant body has a single opening which has a fluidic operative connection to the cavity and by way of which the cavity is fluidically connected to the surrounding area.

9 Claims, 1 Drawing Sheet

(51) Int. Cl.
  *A63B 69/36* (2006.01)
  *G09B 19/00* (2006.01)
  *A63B 24/00* (2006.01)

(52) U.S. Cl.
  CPC ...... *A63B 69/3635* (2013.01); *G09B 19/0038* (2013.01); *A63B 2024/0012* (2013.01); *A63B 2071/0625* (2013.01); *A63B 2220/833* (2013.01); *A63B 2220/836* (2013.01)

(56) References Cited

U.S. PATENT DOCUMENTS

| | | | |
|---|---|---|---|
| 7,335,118 B1 * | 2/2008 | Sung | A63B 69/38 473/461 |
| 7,530,910 B1 * | 5/2009 | Niksich | A63B 69/38 473/522 |
| 9,358,442 B2 | 6/2016 | Mace | |
| 2005/0288119 A1 | 12/2005 | Wang | |
| 2006/0184336 A1 * | 8/2006 | Kolen | G01C 19/00 702/150 |
| 2007/0219744 A1 * | 9/2007 | Kolen | G01C 19/00 702/150 |
| 2013/0079172 A1 | 3/2013 | James | |
| 2015/0057112 A1 | 2/2015 | Sak | |
| 2018/0366025 A1 * | 12/2018 | Dibenedetto | G16H 15/00 |

FOREIGN PATENT DOCUMENTS

| | | | |
|---|---|---|---|
| WO | 95/11730 A1 | 5/1995 | |
| WO | 2009/034189 A1 | 3/2009 | |

* cited by examiner

SIGNALING DEVICE AND APPARATUS

TECHNICAL FIELD OF THE INVENTION

The invention relates to a signaling device for a striking implement, such as a tennis racket, a golf club, for a person, for clothing of the person or the like, for generating signals during a movement of the signaling device. The invention furthermore relates to an implement or a piece of clothing, and in particular a striking implement, for carrying out a movement, such as a tennis racket, a golf club, a table tennis paddle, a baseball bat, or a piece of sportswear or the like. The invention also relates to a device for learning and/or improving sequences of movements. The invention moreover relates to a method for learning and/or improving sequences of movements, and in particular for learning and/or improving body postures and/or striking movements. The invention additionally relates to a use of a method according to the invention and/or of a device according to the invention for learning and/or improving sequences of movements. The invention also relates to a computer program, including program code means for carrying out a method. The invention furthermore relates to a computer program product including program code means stored on a computer-readable medium so as to carry out a method according to the invention when the program runs on a computer. Finally, the invention relates to a system for learning and/or improving sequences of movements, and in particular for learning and/or improving body postures and/or striking movements.

DISCUSSION OF RELATED ART

Signaling devices for learning a strike, a swing or a movement using a corresponding striking implement, such as a tennis racket or a golf club, are known from the prior art. Such signaling devices can be detachably provided on the corresponding striking implement and, depending on the execution of the strike, output an acoustic signal.

A whistle is known from U.S. Pat. No. 5,340,102 A, which generates a first whistling sound when a forehand or backhand movement is carried out correctly, and a second whistling sound when a top spin movement is carried out. The resonant body, which here is oriented in the striking direction, is implemented as a cylinder having opened ends, including a vibration generator at one end, and is pivotably attached in the holding device. The sound is generated as a function of the racket inclination here, and not as a function of a spin movement. The whistling sound is thus generated independently from the air current in the Y direction.

A whistle to be attached to sports implements, such as striking apparatuses, is known from DE 37 41 927 A1. This whistle includes a body having a through-passage extending through the body and is able to generate a whistling sound as a result of the air flowing through the through-passage. The body includes a holding device for detachably holding the whistle on a sports implement, wherein the through-passage is aligned, to a certain degree, with the direction of movement of the sports implement so as force the ambient air through the through-passage and generate a whistling sound when the sports implement is swung through a stroke arc, and in particular the sports implement is swung in the direction of a ball, which is to say when a hit is carried out. The whistle is designed as a training aid for the development of audio-muscular coordination for improving the execution of strikes. In the known whistle, the resonant body thereof has an acoustic operative connection to two openings. The one opening is oriented in the striking direction, and the other opening is oriented in the opposite direction. Both openings are provided with funnel-shaped air inlets. This whistle can only be used to practice forehand movements and backhand movements, regardless of the correct top spin technique, since here only hitting hard yields a successful sound.

Moreover, video analysis devices and other analytical devices for correcting and/or analyzing sequences of movements are commonly known from the prior art.

A tennis racket including a measuring system is known from U.S. Pat. No. 9,358,442 A1 The measuring system includes a sensor for detecting sequences of movements, which is fixed to the tennis racket. Moreover, multiple sequences of movements are analyzed so as to establish possible deviations. The applied method is designed for subsequent analysis. Direct feedback via an output unit is not disclosed.

A golf dub including a sensor is known from US 2005/0288119 A1 in which data is acquired in real time. Thereafter, the acquired data is output, or the acquired data is evaluated, visually by way of a display.

Such analytic devices either only allow subsequent correction of a sequence of movements (for example, video analysis) or generate a sound that is not relevant, or not sufficiently specific for practicing the top spin, the sound being mechanically generated by the movement and therefore not subsequently analyzable.

SUMMARY OF THE INVENTION

It is an object of the present invention to create a signaling device and an implement, which have an improved function and an improved design, and which improve comfort. It is a further object of the present invention to create a method, a device, a use, a computer program, a computer program product and a system in which real-time feedback to a user takes place, wherein the feedback can still be subsequently retrieved or evaluated, and which thus have an improved function and an improved design, and improve comfort.

These and further objects are achieved by a signaling device, an implement, a device, a method, a use, a computer program, a computer program product, and a system as broadly claimed herein.

Advantageous refinements of the invention are described in the dependent claims or are described hereafter in connection with the description of the figures.

The invention thus encompasses the technical teaching that, in a signaling device, and in particular a signaling device for a striking implement such as a tennis racket, a golf club or the like, for the generation of signals during a movement of the signaling device, including a resonant body and a holding device, wherein the resonant body and the holding device are designed to be connected to one another or connectable to one another so as to attach the resonant body by way of the holding device to a striking implement or the like, wherein the resonant body furthermore includes a cavity for generating an acoustic signal during a movement, it is provided that the resonant body has a single opening which has a fluidic operative connection to the cavity, by way of which the cavity is fluidically connected to the surrounding area. The resonant body can have any arbitrary shape. Preferably, the resonant body is designed to be rotation-symmetrical about at least one axis, and preferably about a longitudinal axis. The resonant body preferably has a dome shape. The resonant body is formed by a bottom or a bottom region in a dome shape in one direction. A cavity is formed in the resonant body. The cavity is preferably designed to be rotation-symmetrical about a longitudinal axis. Preferably, the cavity has a substantially cylindrical design. The cavity is surrounded by a wall of the resonant body and the bottom of the resonant body. The resonant body has a single opening, by way of which the surrounding area of the resonant body and the cavity of the resonant body are fluidically connected to one another. The opening is preferably formed at the tip of the dome-shaped resonant body. In particular, the opening is designed as an elongated hole. The bottom is located opposite the opening. The bottom is preferably designed to be without any openings. In one embodiment, multiple openings are provided in the dome-shaped resonant body, while the bottom is designed to be without any openings. Due to the openings formed away from the bottom, an acoustic signal can be achieved during a movement of the signaling device, in conjunction with the cavity and the closed bottom. The signaling device is aligned so that the only opening is aligned transversely with respect to a movement that is to be signaled. In particular, the opening is disposed substantially perpendicularly to the movement to be signaled, so that a flow across the opening takes place, whereby a sound is generated as a result of the resonant cavity across which a flow takes place. This significantly distinguishes the signaling device according to the invention from the known approaches which, at the most, achieve a signal tone based on through-flow. As a result of being designed as a resonant body including only one resonant body opening, an "overblowing" effect is achieved, such as is known from the field of music, for example, as a result of blowing harder into wind instruments so as to utilize the harmonics, with variably rapid movements or incident flow velocities. Accordingly, not only a single tone, but different tones are generated by way of the signaling device according to the invention, as a function of an incident flow velocity. By utilizing the harmonic series, it is possible to generate multiple signals having differing frequencies, which provide improved feedback to the user. The signaling device includes only parts that cannot be tilted, rotated or turned and/or pivoted in another manner relative to the surrounding area, for example by way of joints, bearings and the like. The signaling device is therefore free of components that can be pivoted and/or rotated and/or displaced relative with respect to one another. The signaling device preferably is designed in one piece.

In one embodiment, it is provided that the signaling device includes a resonant body and a holding device, wherein the resonant body and the holding device are designed to be connected to one another or connectable to one another so as to attach the resonant body by way of the holding device to a striking implement or the like, wherein the resonant body furthermore includes a cavity for generating an acoustic signal during a movement, wherein the resonant body has a single opening which has a fluidic operative connection to the cavity, by way of which the cavity is fluidically connected to the surrounding area. In one embodiment, the signaling device includes a resonant body that is connected to a holding device. In another embodiment, two resonant bodies are connected to the holding device. The holding device can be designed in one piece. In another embodiment, the holding device has a multi-piece design, for example a two-piece design. If the signaling device includes two resonant bodies, these are disposed on the holding device so as to be rotated approximately 180° with respect to one another. This means that the respective openings of the resonant bodies are located at opposite ends of the resonant body. In this way, a signaling device is provided with two resonant bodies. When used on a tennis racket, and in particular when clamped between the sides of the strings of a tennis racket, these protrude on each side at an angle of approximately 90°, but substantially transversely to the surface area or plane spanned by the strings. By virtue of the double design of the invention, increased playing comfort is ensured.

In one embodiment, it is provided that the resonant body includes a bottom delimiting the cavity on one end side. In one embodiment, the bottom is designed in one piece with the resonant body. In another embodiment, the bottom and the resonant body are separate and preferably connected to one another, preferably non-detachably. The connection can take place integrally, by way of force fit and/or by way of form fit. The bottom is preferably made of the same material as the resonant body. In another embodiment, the bottom is made of a different material than the resonant body.

In another embodiment, it is provided that the holding device is disposed on the bottom. The holding device is preferably integrated on and/or in the bottom, for example in the form of a groove. For this purpose, the bottom is made of an elastic material, whereby detachment and re-attachment is possible multiple times. Other embodiments of holding devices are conceivable, for example clips, clamps or the like. In one embodiment, in the region of the groove, the holding device has a different cross-section or a different cross-sectional shape than in the portion adjoining the groove, or in the portions adjoining the groove. In the region of the groove, the holding device, for example, has a substantially rectangular or square cross-section. In contrast, the portion adjoining in a longitudinal direction, or longitudinal extension, has a circular or oval cross-section. The cross-section of the portion between the region of the groove and the resonant body may likewise be circular or oval, for example, but may also have a different cross-section. A connecting part is thus formed in the region of the groove, which connects the bottom plate portion of the holding device to the portion of the holding device forming the bottom of the resonant body. The connecting part is designed so as to at least substantially prevent rotation of the signaling device as a whole. The holding device preferably has an elastic design. The connecting part is preferably designed so as to be able to adapt to and fit between at least the common string spacings of a tennis racket. In a position ready for use or in a usage position, the connecting part is thus seated clamped between the adjoining tennis racket strings.

Another embodiment provides for the opening to be disposed on the other end, opposite the bottom. The bottom has no opening, and thus has a closed design. The resonant body has at least one opening. Preferably, the opening is formed away from the bottom, and thus at the tip of the resonant body. The opening has a constant cross-section in the direction of the longitudinal axis. An acoustic signal can be set by way of the cross-section of the opening.

Still another embodiment provides for a cross-section of the opening to have a rotation-symmetrical design at least about a longitudinal axis extending from the one end side to the other end side. The opening or the opening cross-section preferably has a mirror-symmetrical design, for example in the form of an elongated hole.

In one embodiment, it is also provided that the resonant body and/or the cavity are rotation-symmetrical, at least about the longitudinal axis.

Furthermore, one embodiment provides that the center of the opening and/or of the opening cross-section is located on the longitudinal axis. The cross-section of the opening is preferably constant in the longitudinal direction, and does not have a funnel-shaped design.

Moreover, in one embodiment it is provided that the opening cross-section and/or the opening are designed as an elongated hole.

Yet another embodiment provides for the cavity to have a hollow volume, and for the resonant body to have a resonance volume, and the volume ratio of the hollow volume to the resonance volume to be designed to have a predefined ratio with respect to one another, which is matched to a striking velocity range. The striking velocity range is based on the skill of the respective player. Trained players strike with a higher striking velocity, which is to say in a higher striking velocity range. Untrained players strike with a lower striking velocity, which is to say in a lower striking velocity range. However, it is not the hitting velocity that is crucial, but the peak velocity of the striking apparatus in the relevant direction about the center of rotation (hand). The volumes can be set via the selection of parameters of the resonant body. Parameters that can be used for setting the volumes include, for example, the radius of curvature of the dome of the whistle, and the length between the bottom of the resonant body and the elongated hole, and thus the height of the cavity and the radius of the resonant body (or the thickness of the resonant body).

The invention furthermore encompasses the technical teaching that, in an implement, and in particular a striking implement, for carrying out a movement, such as a swing or a strike, for example by way of a tennis racket, a golf club, a table tennis paddle, a baseball bat or the like, it is provided that the implement includes at least one above-described signaling device. The striking implement is preferably designed as a tennis racket.

When the signaling device is disposed on a tennis racket, or more precisely between the sides of the strings, the opening is located in a plane parallel to the plane spanned by the sides. During a striking movement approximately perpendicular to the opening, and thus also to the plane spanned by the strings, no signal is generated. A signal is generated based on the flow across the opening only when the inclined position is sufficient, or when the striking movement deviates in the Y direction, wherein the X direction corresponds to the direction for straight hitting without spin.

The invention also encompasses the technical teaching that, in a device for learning and/or improving sequences of movements, and in particular for learning and/or improving body postures and/or striking movements, including at least one signaling device according to the invention, as described herein.

In one embodiment, it is provided that the device for learning and/or improving sequences of movements, and in particular for learning and/or improving body postures and/or striking movements, includes at least one sensor for detecting at least a portion of a movement (actual or target, or both), at least one memory area for defining a target sequence of movements and/or a permissible deviation from a target sequence of movements, at least one memory area for storing the actual sequence of movements to be learned or to be improved by way of the at least one sensor, at least one comparison area for comparing the actual sequence of movements to the target sequence of movements, wherein the signaling device is designed as an output unit for outputting at least one signal as a function of a deviation of the actual sequence of movements from the target sequence of movements, wherein the output unit and/or the areas are designed so that the signal is output during the sequence of movements, whereby feedback regarding the actual sequence of movements may take place even during the sequence of movements, and/or wherein the output unit and/or the areas are designed so that the output signal varies as a function of a deviation of the actual sequence of movements from the target sequence of movements, at least with respect to the intensity, time and/or frequency.

In one embodiment, it is provided that the device furthermore includes an implement according to the invention, as described herein, and/or a piece of clothing according to the invention, as described herein. The term 'piece of clothing' includes all garments wearable on the skin, including carriers for a signaling device that can be applied to the skin, thus also including patches, tapes or the like.

The invention also encompasses the technical teaching that a method for learning and/or improving (actual) sequences of movements, and in particular for learning and/or improving body postures and/or striking movements, includes the following steps: providing at least one signaling device according to the invention, as described herein, and outputting at least one signal as a function of the actual sequence of movements, wherein the signal is output during the sequence of movements, so that feedback regarding the actual sequence of movements may take place even during the sequence of movements, and/or wherein the output is varied as a function of the actual movement, at least with respect to the intensity, time and/or frequency, and/or providing a sensor for detecting at least a portion of a movement, defining a target sequence of movements and/or a permissible deviation from a target sequence of movements, detecting the actual sequence of movements to be learned or to be improved by way of the at least one sensor, comparing the actual sequence of movements to the target sequence of movements, and outputting at least one signal as a function of a deviation of the actual sequence of movements from the target sequence of movements, wherein the signal is output during the sequence of movements, so that feedback regarding the actual sequence of movements may take place even during the sequence of movements, and/or wherein the output signal varies as a function of a deviation of the actual sequence of movements from the target sequence of movements, at least with respect to the intensity, time and/or frequency.

The invention, in particular, encompasses the technical teaching that a method for learning and/or improving sequences of movements, and in particular for learning and/or improving body postures and/or striking movements, is provided including the following steps: providing at least one sensor for detecting at least a portion of a movement, defining a target sequence of movements and/or a permissible deviation from a target sequence of movements, detecting the actual sequence of movements to be learned or to be improved by way of the at least one sensor, comparing the actual sequence of movements to the target sequence of movements, and outputting at least one signal as a function of a deviation of the actual sequence of movements from the target sequence of movements, wherein the signal is output during the sequence of movements, so that feedback regarding the actual sequence of movements may take place even during the sequence of movements and, if necessary, a correction can be carried out during the sequence of movements, or an evaluation and adaptation can be carried out immediately thereafter, and/or wherein the output signal varies as a function of a deviation of the actual sequence of movements from the target sequence of movements, at least with respect to the intensity, time and/or frequency.

In one embodiment of the invention, it is provided that the at least one sensor is disposed on the subject carrying out the sequence of movements.

In another embodiment of the invention, it is provided that the degree of the deviations of the actual sequence of movements from the target sequence of movements is output using different signals.

In one embodiment, it is provided that the at least one sensor is designed to be attached on the subject carrying out the sequence of movements.

In a further embodiment, it is provided that the at least one output unit and/or the areas are designed so that the degree of the deviations of the actual sequence of movements from the target sequence of movements can be output using different signals.

The invention also encompasses the technical teaching that a use of a signaling device according to the invention, as described herein, of an implement and/or a piece of clothing according to the invention, as described herein, of a device according to the invention, as described herein, and/or of a method according to the invention, as described herein, for learning and/or improving sequences of movements, and in particular for learning and/or improving body postures and/or striking movements, wherein, in particular, feedback regarding a deviation of an actual sequence of movements from a target sequence of movements, takes place even during the sequence of movements.

In particular, the invention encompasses the technical teaching that a use of a method according to the invention and/or of a device according to the invention for learning and/or improving sequences of movements, and in particular for learning and/or improving body postures and/or striking movements is provided, wherein, in particular, feedback regarding a deviation of an actual sequence of movements from a target sequence of movements takes place even during the sequence of movements, and in particular based on electronically and/or electrically detected and/or generated signals.

Moreover, the invention encompasses the technical teaching that a computer program is provided, including program code means for carrying out all the steps according to the method according to the invention when the program is executed on a computer.

In addition, the invention encompasses the technical teaching that a computer program product is provided, including program code means, which are stored on a computer-readable medium, for carrying out the method according to the invention when the program runs on a computer.

Finally, the invention encompasses the technical teaching that, in a system for learning and/or improving sequences of movements, and in particular for learning and/or improving body postures and/or striking movements, including means for carrying out the method according to the invention, as described herein, and/or a signaling device according to the invention, as described herein, and/or an implement and/or a piece of clothing according to the invention, as described herein, and/or a device according to the present invention, as described herein, and a computer program and/or computer program product according to the invention, as described herein, wherein the sequence of movements that is carried out is detected by way of a sensor provided on a striking implement, such as a tennis racket, a golf club or another sports striking apparatus or sports implement, or on a piece of clothing or a user, and an acoustic signal generated as a function of the sequence of movements detected by way of the sensor is output during the sequence of movements, so that auditory references are made available, which can then be utilized as online feedback.

In particular, the invention encompasses the technical teaching that, in a system for learning and/or improving sequences of movements, and in particular for learning and/or improving body postures and/or striking movements, it is provided that the means for carrying out the method according to the invention and/or a device according to the invention, and a computer program and/or a computer program product are present, wherein the sequence of movements that is carried out is detected by way of a sensor provided on a tennis racket, a golf dub or another sports striking apparatus or sports implement, or on a piece of clothing or a user, and an acoustic signal is generated during the sequence of movements, so that auditory references are made available, which can then be utilized as online feedback.

The sequence of movements, or the sequences of movements, can be arbitrary sequences of movements. For example, a sequence of movements is a succession of at least two body postures, for example during a jump, during a run or the like. In another embodiment, a sequence of movements is a more complex movement, such as during a strike carried out by way of a striking apparatus, for example a tennis stroke, a golf swing, an ice hockey shot or the like.

At least one sensor is provided for detecting a sequence of movements, and thus a minimum of at least two body postures at differing points in time. The sensor is designed to detect a sequence of movements. For this purpose, in one embodiment, the sensor is designed as an acceleration sensor. This detects an acceleration experienced by the sensor, for example. The sensor is therefore preferably disposed in a location in which the sequence of movements is to be detected. For example, for detecting a jump, the sensor is provided at least on a body part of the user and/or on the clothing thereof, for example on a head, on an arm, on a leg or the like. In another embodiment, the sensor is disposed on and/or in a striking apparatus, for example in a tennis racket frame, in a golf club head or the like. The sensor is disposed so as not to impair the movement. When attached on a striking apparatus or the like, a taring unit is preferably provided, which tares an undesirable weight deviation resulting from the sensors. Preferably, the sensor is disposed as close to the center of gravity of a striking apparatus or a striking implement as possible.

In one embodiment, one sensor is provided. In another embodiment, multiple sensors are provided. If multiple sensors are provided, the sensors are preferably identical. In another embodiment, at least some of the sensors have a different design.

Other suitable sensors may be provided instead of, or in addition to, a movement sensor. In one embodiment, for example, an inertial sensor is provided. Such an inertial sensor is designed to determine the position thereof in space. In one embodiment, this includes a magnetic field sensor, an acceleration sensor and a gyroscope. A rotational measurement is possible by way of the gyroscope.

In addition, or as an alternative, further sensors may be pressure sensors, position sensors, shape sensors, strain gauges, piezoelectric crystal strips, pressure distribution films or the like. It is possible to provide different types of sensors.

At least one sensor is preferably disposed on the striking implement by way of a damping unit so as to reduce undesirable vibrations of the sensor. In this way, the sensor is protected against vibrations, which could distort the detection of movements, velocities, accelerations and the like. In another embodiment, the sensor can be designed as a vibration damper for tennis rackets and the like. This is then easily disposed in the string pattern of the tennis racket.

A target sequence of movements is defined so as to convey to a user, and in particular convey in real time, feedback regarding the completed sequence of movements or actual sequence of movements compared to a target sequence of movements. The target sequence of movements is preferably stored in a memory area for defining a target sequence of movements and/or a permissible deviation from a target sequence of movements, and may also be retrieved therefrom. In one embodiment the definition of a target sequence of movements is programmed or retrieved from a memory and transmitted into the memory area. In another embodiment, the target sequence of movements is carried out by a selected user by carrying out the target sequence of movements. In this case, it is possible to switch between a detection mode, in which the actual sequence of movements is detected, and a definition mode, in which the target sequence of movements is specified or defined. The target sequence of movements is preferably specified or defined by way of vector data.

For the definition of the target sequence of movements, initially an official verification, calibration and/or a reference point or position determination is carried out. During calibration, for example, a target sequence of movements is carried out, and whether the sensor also acquires the data for the target sequence of movements is checked. For example, a target sequence of movements can be carried out for calibration purposes at a velocity of 100 km/h. Then, whether the sensor correctly detects the velocity is checked. If not, the sensor is re-calibrated. For the position determination or reference point determination, the user or the striking implement is moved into a reference position. In the case of a striking implement, for example, this is placed on the ground. A tennis racket can be placed flat on the ground, for example, so as to determine a reference position. As a result of the reference position, a coordinate system is established for the sensor or the device, so that it is possible to acquire and/or program and/or define movement data in relation to this established coordinate system. All movement data can then be acquired or defined relative to the original position of the striking apparatus/user/sports implement. As soon as the user and/or the striking apparatus has assumed the reference position, this position is detected by the sensor or the sensors, for example by way of a signal. The signal can be triggered, for example, via a button, by voice command, or in another arbitrary manner. A target sequence of movements can be defined as a function of the reference position. For example, if a striking implement assumes a preferred position or location when placed on level ground, in one embodiment, the target movement is predefined as a function of this preferred position, for example by way of relative relationships with respect to this reference position. The data of the actual sequence of movements is preferably saved or stored in vector data. The target/actual comparison between the target and actual sequences of movements preferably takes place based on the stored vector data.

The sensor is designed to transmit data. For example, the sensor is designed for wireless data transmission. Accordingly, the sensor transmits the acquired data to a memory area, a comparison area and/or another unit. In other embodiments, the sensor and the other units are integrated, and a wireless transmission is carried out. For example, the device can thus be connected to a mobile telephone or another mobile or stationary evaluation unit (laptop, PC) in a wired and/or \wireless manner.

Following the set-up of the target sequence of movements, the detection mode is switched to, so that the device is ready for leaning. In one embodiment, the sensor is designed so as to permanently acquire data. In another embodiment, the sensor can be activated and deactivated, whereby uninterrupted data acquisition is achieved. In one embodiment, the activation and deactivation take place manually, for example by the operation of an appropriate signal transmitter, such as a button switch or the like. In another embodiment, the acquisition is, for example, movement-controlled or position-controlled. For example, the device or the sensor switches on or off depending on the sequence of movements. A trigger for an activation and/or a deactivation may be a velocity, an acceleration, a rotation, a change in altitude or the like. The device or the sensor can also be activated and deactivated in a remote-controlled manner. In another embodiment, the activation and/or deactivation take place in a time-controlled manner. For example, the sensor switches on or off at a certain time and/or after a certain period of time has lapsed. In one embodiment, the time control is coupled to a movement control. For example, in one embodiment, an activation/deactivation takes place 10 seconds without a movement of the sensor.

The sensor is supplied with power by way of an appropriate energy source. In one embodiment, the sequence of movements is stored in a memory area. In one embodiment, the memory area is designed as a volatile memory or a temporary memory, which is deleted after the acquired data has been transmitted. In another embodiment, the memory is designed as a permanent memory in which the data remains stored, for example, for later evaluation, until an explicit delete signal is issued.

So as to ascertain a deviation of the actual sequence of movements from the target sequence of movements, a tolerance range or a range for a permissible deviation is to be defined. This deviation can be defined, for example, by carrying out multiple target movements. In addition, or as an alternative, the deviation can be programmed or predefined in another manner. For example, in one embodiment, the deviation is defined as a deviation from coordinates, or a rotation about coordinate axes. The deviation can be defined, for example, as a percentage-based deviation in the x, y and/or z axes. Moreover, in a further embodiment, the deviation can be defined by way of a permissible angle of rotation about the x, y and/or z axes. In yet another embodiment, the deviation is defined as a deviation from a velocity and/or an acceleration. Moreover, arbitrary combinations are possible.

In a comparison area, the data of the actual sequence of movements is compared to the data of the target sequence of movements, optionally by taking the data for a deviation into consideration. If the deviation is within a permissible tolerance range, or alternatively is outside a permissible tolerance range, an appropriate action is started. The action provides for a signal to be output as a function of the deviation. The signal can be any arbitrary signal. The output of an acoustic signal or of multiple acoustic signals is preferred. In other embodiments, other signals are additionally or alternatively output, for example optical signals.

The comparison and the output of the outputted signal, for example of an acoustic signal or of a visual signal, takes place in real time or with a maximum delay of a few milliseconds, for example in a range of less than 10 milliseconds (ms), more preferably of less than 5 ms, and most preferably of less than 2 ms. In this way, a user receives feedback as to whether the sequence of movements being carried out is within, or outside, a tolerance range, even while the sequence of movements is still in progress. Based on this feedback, the user is able to correct the sequence of movements, if necessary, even while it is still in progress.

For the comparison of the actual data to the target data, at least one memory area is provided for defining the target sequence of movements or the data regarding the target sequence of movements. The data can be position coordinates, acceleration data, velocity data, vibration data and/or rotation data, and any further data necessary for recording sequences of movements. The data of the target sequence of movement is stored in the corresponding memory area and can later be retrieved, corrected and/or overwritten as needed. The data for the deviation is also stored in this memory.

Furthermore, a memory area for defining the actual sequence of movements or the data regarding the actual sequence of movements is provided. The data can be position coordinates, acceleration data, velocity data, vibration data and/or rotation data, and any further data necessary for recording sequences of movements. The data of the actual sequence of movements is stored in the corresponding memory area and can later be retrieved, corrected and/or overwritten as needed.

Furthermore, a comparison area is provided. In the comparison area, the data for the actual sequence of movements is compared to the data for the target sequence of movements, wherein the data for the deviation is taken into consideration. If the actual sequence of movements or the data thereof is within or outside a permissible range, depending on the setting, a signal is generated. It is possible to set whether a signal is generated when a tolerance range is exceeded or when the data of the actual sequence of movements is within the tolerance range. The signal is then output via an appropriate signal transmitter or another output unit. The output unit can be a speaker, a light signal transmitter or another signal transmitter. In one embodiment, multiple signal transmitters are provided, for example so as to achieve a spatial effect.

In one embodiment, the memory area, the comparison area and/or the output unit are integrated. For example, in one embodiment, the areas and the unit are designed to be integrated as a mobile telephone. In other embodiments, the areas and the unit are designed to be separate at least in part.

To indicate the degree of the deviations of the actual sequence of movements from the target sequence of movements, the signal transmitter or the output unit is designed so that the degree of the deviation is output in the form of different signals or varying signals. The signals themselves may be of different kinds, for example one as an acoustic signal and another as an optical signal. In another embodiment, the signals are of the same type and differ, for example, with respect to the frequency and/or intensity thereof (volume, brightness). A duration of the signals may vary arbitrarily. For example, the signal is issued during the entire sequence of movements. In another embodiment, the signal is issued throughout the entire duration of the deviation from the target sequence of movements. In still another embodiment, a signal is already issued before and/or after the sequence of movements, for example to indicate operational readiness and/or to provide feedback before and/or after the movement that is carried out. In this way, the signal may have a reminder function or serve as a gratification signal. In one embodiment, the signal is designed to be an uninterrupted signal. In another embodiment, the signal is designed to be an interrupted signal. A combination is likewise possible. Furthermore, it is possible for multiple signals to be output by the signaling unit, for example an interrupted signal before a sequence of movements, and an uninterrupted signal during the sequence of movements or during a deviation from the target sequence of movements. Again, different combinations can be implemented. In one embodiment, the signal is varied as a function of a velocity and/or an acceleration with which the actual movement is carried out. The sensor following the sequence of movements acquires the corresponding data, and a signal is generated/outputted, which, for example, has a higher frequency and/or volume at a high velocity, and a lower frequency/volume or intensity at a lower velocity. The signal is varied as a function of the deviation of the target sequence of movements from the actual sequence of movements. In one embodiment, an acoustic signal that is louder and/or has a higher frequency can be heard in the case of a large deviation than with a lesser deviation. In another embodiment, the situation is reversed, depending on the setting. Preferably, the signal is an acoustic signal. The signal is generated, for example, via an evaluation unit, such as a mobile telephone including an appropriate app. The output unit is preferably designed as an acoustic output unit. The signal is preferably varied continuously, which is to say without frequency and/or intensity jumps. In another embodiment, the signal is not varied continuously, but in jumps, for example. The frequency jumps are uniform in one embodiment, which is to say an appropriate change in frequency of the same magnitude takes place with every jump. In another embodiment, the jumps are not uniform. In one embodiment, the jumps are predefined. In another embodiment, the jumps vary. A frequency range of the signals is preferably within a range that can be perceived by the user. In the case of an acoustic signal, the frequency range for human users preferably ranges between approximately 20 Hz and 20 kHz. In the case of a visual signal, the frequency range of the signal or of the signals for a human user is preferably in a range of approximately 789 THz to 384 HTz, which is to say in a light range having wavelengths of approximately 380 nm to approximately 780 nm. Different frequencies may be provided for other users. If additional receivers are used, frequencies that can be perceived by the respective receiver can be used. Preferably, the deviations are grouped, and a different signal is assigned to each grouping. In one embodiment, it is provided that the signal varies if the actual sequence of movements does not approach the target sequence of movements across multiple sequences of movements with the same target sequence of movements, which is to say if the deviation is not decreased. A target sequence of movements is always assigned to an actual sequence of movements. The actual sequence of movements can be repeated several times, wherein the target sequence of movements remains the same. It is possible to set the tolerance range around the target sequence of movements, which is to say the range in which an actual sequence of movements is still considered to be acceptable or equatable to the target sequence of movements. The signal is varied or changed at least with respect to one parameter. Preferably, an acoustic signal is varied with respect to the frequency thereof and/or the intensity thereof. The same applies to a visual signal or a combination of a visual signal and an acoustic signal.

So as to obtain the most precise data possible regarding the actual sequence of movements, the sensor is disposed in appropriate locations on the subject or object carrying out the sequence of movements. In one embodiment, the sensor is disposed on a head of a striking implement, for example a tennis racket, a golf club or the like. However, an arrangement on a paddle, an oar, a bow or other sports implements is also conceivable. The sensor can also be provided directly on the user, for example on the skin thereof at appropriate muscle groups so as to detect the entire sequence of movements thereof, and the sequence of movements of the user overall. In still another embodiment, the sensor is disposed on the clothing of the user. The sensor may be disposed separately on the clothing or may already be integrated in the clothing.

The device can be designed as a signaling device, and in particular a signaling device for a striking implement such as a tennis racket, a golf club or the like, for generating a signal during a movement of the signaling device. The signaling device includes a sensor, which detects a movement. Furthermore, an evaluation unit is provided, which generates a signal electrically or electronically as a function of the movement. The signaling device includes a holding device so as to attach the sensor on the striking implement.

In another embodiment, it is provided that the holding device is designed as a clip, a clamp or the like, for example. For a striking implement, the device, or at least the sensor, is embedded in the striking apparatus or designed integral therewith.

For example, a striking velocity in the vertical, or in the perpendicular/frontal plane, can be detected by way of the sensor. A striking velocity range is based on the skill of the respective player. Trained players strike with a higher striking velocity, which is to say in a higher striking velocity range. Untrained players strike with a lower striking velocity, which is to say in a lower striking velocity range. Accordingly, a tolerance range or a deviation can be set or programmed.

In one embodiment, the device is designed as a striking implement, for example as a tennis racket, a golf club, a hockey stick or the like, or as a piece of clothing, in which the sensor and the areas are integrated, and if necessary the output unit is also integrated. In one embodiment, the components comprise corresponding interfaces for communication with other components.

In one embodiment, a system can comprise different striking apparatuses, for example a tennis racket, a golf club, a table tennis paddle, a baseball bat, a hockey stick or the like. In one embodiment, the system includes a piece of clothing. In one embodiment, at least the sensor is integrated into the piece of clothing. Preferably, an evaluation unit having memory areas and a comparison area is also integrated. In one embodiment, the sensor includes the memory areas and the comparison area, as well as a transmission interface. A signal can be transmitted via the transmission interface, for example to a mobile telephone, which is then able to output a signal.

In one exemplary embodiment, the system includes a striking implement designed as a tennis racket. A sensor is attached to the racket. Preferably, a sensor is disposed in the racket, and more precisely the racket frame. The racket is placed on the ground in the definition mode. When the racket is located on the ground in an idle position, this is defined as a reference or idle position, for example by pushing a button on the racket and/or the sensor, or alternatively by way of remote control, for example by transmitting a signal via an app by way of a mobile telephone or the like. For this purpose, the sensor includes a corresponding receiver unit. In one embodiment, the reference position is defined, by detecting the coordinates thereof, as a horizontal position or a starting or reference position. So as to define a movement range, when a signal such as a sound is output as soon as an actual sequence of movements corresponds to a target sequence of movements, if necessary taking deviations into consideration, an angular range in which the actual sequence of movements is still within the tolerance range is defined, for example, proceeding from the reference position. For this purpose, it is at least necessary to detect the sequence of movements in the X coordinate direction. More precisely, at least the movement direction and/or the intensity of the movement in the X axis are detected and evaluated. In a preferred embodiment, a movement vector is detected and/or predefined. The movement vector is designed as a vector which is detected in a space over a predetermined time period when the sequence of movements is being carried out, and which includes at least one component in an x direction and one component in the y direction and/or z direction, proceeding from a starting X component. The vector pointing from the detected X starting component in the detected x-y direction, x-z direction or x-y-z direction is based on the data from the official verification process. This takes place by dividing the movement vector by the horizontal in the x and y directions during the official verification (reference position). The evaluation takes place by way of the comparison range. This is carried out for all detected vectors and/or movements. By detecting or specifying the data at least in the direction of the X axis, it is possible to define a strike forward against a ball and a backswing (to the rear). To define a forehand shot or backhand shot, the position of the racket during the course of the striking movement must be detected. For example, during a shot, the head is downwardly inclined to the right in the case of a right-handed user. The striking hand holding the racket is positioned closer to the body than the sensor (for example, to the left of the sensor, viewed from behind). In the case of a backhand shot, the striking hand is accordingly located on the other side (in the example to the right) of the sensor. In addition, the inclination toward the left is detected. By way of the corresponding detection of the inclination the sensor or the device can also detect which shot, forehand or backhand, was practiced. All that need be entered is whether this is for a right-handed or left-handed user. The device provides a corresponding input option. When the method is employed, the left-handed/right-handed user input is thus taken into consideration. By recording the sequence of movements, it is also possible to implement tracking.

Preferably, a sound signal is outputted in the embodiment. It is possible to select the manner of the sound signal, for example via the computer program (app) or other input options. Moreover, it is possible to set the time at which the sound is to be heard, which is to say as a function of the striking velocity, for example. The range in which a sound or another signal is to be output is predefined or preprogrammed in stages, for example. The user can then select between different ranges, for example via the computer program (app). In other versions, the user can select a seamless transition or personally define ranges. After a strike, a switch into a mute mode can take place. For this purpose, a corresponding mute switch is provided, either on the sensor/device or, in the form of software, via the computer program. In this mode, the hitting point in time is identified based on a change in the velocity or the acceleration of the sensor or the racket at the hitting point in time, at least in the X direction. As an alternative, the hitting point in time may also be identified by identifying the string pattern during impact of the ball. When the mute mode is activated, sounds that have been outputted until then are silenced or muted.

As an alternative, or in addition, it is possible, based on tracking (location tracking), to identify how often a forehand, a backhand, a serve or another certain stroke to be learned has reached the target range. A deviation or a changed target range, as a result of the target range being achieved multiple times, can be predefined. The sensor can be newly officially verified/adjusted, or the tolerance range can be adapted, when a certain number of successful hits (achievement of the target range) has been reached. The deviation is decreased in one embodiment. The decrease takes place symmetrically with respect to an original range in one embodiment. In another embodiment, the adaptation takes place asymmetrically with respect to an original tolerance range or a predefined deviation range. This means that, depending on which boundary of the target range the actual sequence of movements is located further away from, the adaptation is made to a greater degree from the boundary located further away. The range is changed asymmetrically. If the actual sequence of movements is approximately in the middle of the range defined by the target sequence of movements, a symmetrical change of the boundaries is carried out. In the latter case, the two boundaries are approximately adapted by the same magnitude. In the asymmetrical case, only one boundary is adapted, or the two boundaries are adapted by differing magnitudes. The adaptation preferably takes place automatically, so that a self-learning adaptation is provided. The adaptation can take place within the scope of a learning program. Different lessons are provided in this regard. When a lesson has been repeatedly accomplished, for example another lesson is retrieved, for example having a narrower deviation range. If this is successfully accomplished, the next lesson having yet another narrower deviation range takes place. Once a lesson is not met, the process remains at the current stage/lesson or, if necessary, a switch is made to the next lower stage/lesson. Based on the acquired data, a spin that is achieved on the ball is ascertained or output in one embodiment. An appropriate evaluation unit is provided for this purpose. This ascertains the spin based on the striking velocity, strike acceleration and/or tracking data.

Preferably, it is provided in the system that a signal is output by way of a sensor and an evaluation unit, which is implemented, for example, via corresponding software or a computer program, when a target movement is achieved, if necessary taking a deviation into consideration.

In another embodiment, it is provided that the sensor is designed in the form of pressure, position and/or shape sensors. These are integrated into clothing, preferably underwear or long sleeves, tights or shorts. The sensors are primarily provided in the shoulder region, in the chest region and/or in the spinal column region on the back. Other regions are likewise conceivable. The sensors are designed to be flexible and conform to the current body posture. For the application, the user assumes a target body posture, in particular with the back and/or shoulder. Accordingly, the sensors also assume this target body posture. This target body posture, which is comparable to the target sequence of movements, is defined as the reference position, similarly to what has been described above. The sensors now detect the further sequence of movements. A comparison is carried out based on the predetermined deviation, in conjunction with the target sequence of movements. A signal is output with a corresponding deviation, depending on the degree of the deviation. Preferably, the degree of the deviation is grouped, and a specific signal is assigned to each group. The signals differ with respect to the intensity and/or frequency, for example, and in one embodiment can be freely selected or set. A warning signal, which cannot be varied, for example, can be output during a sequence of movements that is critical, for example since it is in a range that poses a health hazard.

The sensors are designed as piezoelectric crystal strips, for example, which are incorporated into a material that does not conduct electrical current, preferably in strip form. These sensors are then incorporated into the clothing, for example into underwear, and there preferably in the region of the spinal column, the shoulder area or close to other body areas. Since the piezoelectric crystals respond to mechanical pressure, these give off an electric stimulus when pressure is applied as a result of an actual movement. These stimuli are measurable and are detected, for example, by way of a suitable measuring device. The acquired data is then forwarded to a computer program or another signaling device, for example, a mobile telephone having a corresponding app. Forwarding preferably takes place by way of Bluetooth, which is to say wirelessly, but in other embodiments may also take place in a wired manner. A corresponding signal is generated. Instead of piezoelectric crystals, it is also possible to use strain gauges, which have a strip shape or are designed in the manner of a wire and are processed in clothing. The wire is accordingly expanded or compressed during an actual sequence of movements. During an expansion or compression, the conductivity of the strain gauge changes, which is detected. The change in conductivity is accordingly processed, and a corresponding signal is output. Still another embodiment provides for the sensors to be designed in the form of a pressure distribution film. The operating principle is similar to what has been described above. A signal, the evaluation of which results in the output of a corresponding signal, which is preferably a sound or multiple sounds, is generated from a detected actual sequence of movements.

Preferably, it is provided that the device includes a sensor that is designed to be membrane-free. The sensor is designed as a movement sensor, which detects accelerations, movements, velocities, changes in positions and the like, preferably without a membrane. In one embodiment, it is provided that the device is free of output units that output visual signals. In a preferred embodiment, the device only outputs acoustic signals via the output unit.

In one embodiment, the output signal varies during a sequence of movements to be learned. The signal preferably varies continuously during the movement. In another embodiment, the signal varies abruptly, for example due to a grouping of sequences of movement data.

In another preferred embodiment, it is provided that the method and/or the device or the system are designed to be self-learning.

In one embodiment, a reference movement or a target sequence of movements is, or multiple reference movements or target sequences of movements are, recorded, defined and/or stored in the corresponding memory area. The comparison unit or another evaluation unit, for example an app or a corresponding other computer program, then ascertains the current individual status of the user by analyzing multiple actual sequences of movements, or by analyzing a starting sequence of movements of the user or of the striking apparatus at the start. The evaluation unit or another processing unit creates adaptations from the target and actual sequences of movements, and sets a suitable training level, depending on the skill of the user, which is to say depending on the degree of the deviations of the actual sequences of movements from the predefined target sequence of movement. A mean value is found based on the data recorded by the sensors, which are the acceleration sensors here. The mean value can be found both from multiple target sequences of movements or reference movements and/or from multiple actual sequences of movements.

One embodiment of a system is provided in the field of tennis sport. The at least one sensor is disposed on the racket. A reference stroke is, or multiple reference strokes are, carried out, for example by a trainer. As an alternative, stored data of a reference stroke is fed or programmed. Then, the respective user carries out multiple actual sequences of movements, and the data thereof is ascertained. A mean value is calculated from the data. The data is preferably present in the form of vector data or vector movement data. In this way, for example, the level of the swinging velocity in the X and Y directions of the vector is ascertained. The X direction is a horizontal direction. The Y direction is preferably a direction oriented perpendicularly to the X direction, and preferably a vertical direction. Upon evaluation of the data and, if necessary, determination of a deviation of the data of the target sequences of movements and the actual sequences of movements, a suitable level is set. This means that the deviation or the tolerance range is accordingly adapted. In another embodiment, a further portion of a target sequence of movements is enabled or added for detecting the actual sequence of movements. In this way, focus can be placed on partial sequences of movements, and further portions are only detected after proficiency in a certain partial or basic sequence of movements has been attained. For an appropriate or suitable level, for example, a limitation of a minimum and/or of a maximum of an acceleration detection during an actual sequence of movements can be adapted for an X threshold and/or a Y threshold of an acceleration for the output of an acoustic signal. An adaptation to various progressive training levels is thus possible without changing a sensor and/or a signaling unit. It is thus not necessary to preselect a certain unit, such as with a whistle according to the prior art, which is only set for one training level. The device can be variably set for different users to different levels.

In another embodiment, the system or the method and/or the device are provided in the fitness field.

By specifying, and preferably manually specifying, a training weight, a permissible deviation or a tolerance range is predefined. The deviation is set, for example, as a function of a training weight, which is to say a weight of a dumbbell or the like. A higher weight or a higher intensity level by a fitness implement means a higher risk for the user. A deviation or the tolerance range is therefore set or predefined to be narrow. In addition to a specification with respect to the weight or the intensity level, it is also possible to provide a specification with respect to the number of actual sequences of movements to be carried out. This applies to all embodiments. For example, during deadlifts, but also in all other applications, multiple actual sequences of movements can be detected, and a reference movement can be ascertained therefrom. This preferably averaged reference movement is then compared to the target sequence of movements. A deviation from the target sequence of movements is identified or ascertained from the comparison. The predefined deviation or the predefined tolerance range is adapted based on the ascertained actual deviation, so that the deviation is deliberately decreased during the actual sequence of movements. The adaptation of the target deviation or of the predefined tolerance range can be made manually, or based on the ascertained data by the evaluation unit. This method allows the learning of a movement to be controlled independently from the performance level, so that, in the fitness field, for example, a sequence of movements to be practiced can be practiced both with light weights and with heavy weights.

The method is preferably implemented in a computer program, and in particular in an app. In addition to practicing the sequences of movements, the memory areas and the suitable sensors also allow sequences of movements to be stored and tracked. For example, weights, repetitions and the like can be stored and retrieved as tracking data by way of tracking. In one embodiment, this tracking data can then be made available for training at a different time. Individual training data can thus be transmitted to an implement, so that the implement sets the corresponding intensity in a manner that is adapted to the user, and a user does not need to manually set the implements. For example, after a review of the system has been carried out as to whether the actual sequences of movements of a new training unit agree with the data regarding the stored sequences of movements carried out previously in another training unit, which is to say whether the level is still being adhered to, further training levels (heavier weights, faster ball velocity, more repetitions, short succession of sequences of movements and the like) are then provided.

In another embodiment, the system is provided for sprint training. The process is similar to the above methods. One reference run is detected, or multiple reference runs are detected. If necessary, a mean value is created and/or a target sequence of movements is defined from the reference runs. For example, the maximum speed achieved is ascertained. In another embodiment, a holding curve of the maximum speed is additionally and/or alternatively ascertained. This data is documented, for example, in a V-t diagram, or a V-d diagram, which is to say the ratio of the velocity to the time and/or of the velocity to the distance. The data can also be documented and output in tabular or another form. Further data such as times, times until the maximum speed is reached and the like can be acquired. As an alternative or in combination, it is also possible to detect partial sequences of movements such as an arm movement, a leg movement and the like. Certain goals can be set for training. For example, it is possible to predefine the target sequence of movement. For this purpose, it is possible to predefine the target sequence of movements as a function of the reference value by predefining a maximum speed, a knee lift, an arm movement, a holding period for a maximum speed, an overall time and/or a time until the maximum speed is reached. Then, the tolerance range or the deviation around the target sequence of movements can be predefined. This can be set asymmetrically around the target sequence of movement, and in one embodiment, this can include a range that is shifted only toward the top or the bottom. For example, the target sequence of movement can be predefined as a lower limit that is to be surpassed during the actual movement. In one case, the device would then output a signal when a maximum speed is not reached, but would not output a further signal, or would output a varied signal, if the maximum speed is exceeded. In this instance, the tolerance range would be set only toward the top, which is to say toward higher speeds. In another embodiment, the device can also provide a suggestion for practicing partial sequences of movements, for example practicing a higher knee lift, a longer holding period of the maximum speed or the like. For example, the maximum speed can then be kept lower, but maintained slightly longer in return. A variety of combinations are conceivable or retrievable in this regard. So as to avoid overexerting the user, an overload warning level is provided in one embodiment.

In a further embodiment, further reference variables are detected, in addition to the sensor data. In one embodiment, reference variables of the training premises or of the surrounding premises are detected. In the case of a tennis court, this could be a net, a line or the like, for example. In the case of figure skating or ice hockey, this could be boards. In other types of sports, this could accordingly be a basket, a goal, bleachers, a building roof, a box, a display board and the like. The detection can take place by way of a sensor. The detection, however, can also take place separately, for example by way of a separate detection unit. This is then coupled to the evaluation unit. The detection of the external reference variables takes place optically, for example, so that the detection unit is provided as an optical detection unit. The data regarding the external reference variables can also be programmed, or predefined in another manner. The reference variables can be correlated with the data of the acceleration sensor, so that it is easy to calculate, for example, whether a forehand shot or a backhand shot is being carried out.

In one embodiment, a sensor is provided which communicates with an external evaluation unit. The data acquired by the sensor is preferably transmitted wirelessly, for example by radio, Bluetooth or another wireless transmission option, to the evaluation unit. The evaluation unit can be designed as an arbitrary hardware unit including a corresponding CPU, corresponding memory and the like. The evaluation unit can be set, operated or controlled either by way of an integrated operating unit and/or by way of an external unit, for example a cellular phone, a tablet, a notebook, by voice control or the like. In keeping with the data predefined in the evaluation unit and/or the memory areas thereof and the target/actual comparison, the evaluation unit generates a signal (optical, visual and the like). The evaluation unit is preferably disposed in a location in which few obstacles for a wireless data transmission to the sensor are present. In a tennis system, the sensor is provided in and/or on the sports implement, the user and/or the clothing. The evaluation unit is preferably provided on a tennis net. So as to distinguish whether a sequence of movements or partial sequence of movements to be detected is present, different parameters are taken into consideration in the evaluation unit. For example, the position data of the sensor or a velocity, an acceleration, a rotation or the like may be used. In the event that a velocity is used, a velocity threshold is predefined. Other threshold values are likewise conceivable. Since a strike is usually carried out with a higher velocity than a backswing, and the backswing is not to be detected, the sequence of movements is only detected when a predefined velocity is reached. It is possible to combine multiple parameters, for example, the velocity and position or movement direction of the sensor. If the evaluation unit is disposed on a tennis net, for example, the evaluation unit can easily classify a movement away from the evaluation unit as a backswing and possibly disregard this. Movements toward the evaluation unit can be classified as a strike, for example. In this way, less data is required for an evaluation. The evaluation unit then generates the corresponding signal. This may be output directly by the evaluation unit. As an alternative or in combination, the signal can be output by an external or a separate output unit. For this purpose, the evaluation unit sends a corresponding signal to the output unit or output device. Accordingly, the evaluation unit and all connected units or units to be connected comprise corresponding interfaces. In addition to Bluetooth and radio, possible interfaces also include optical cables and the like. A connection can thus be established via an AUX connector and the like, for example. The interfaces or the connections are designed so that a signal can be output in real time. In this way, output times of less than 10 ms are possible, and preferably in the range of 1 ms. The output signal is then varied in keeping with the deviation. Varying the signal does not include the activation and deactivation of a fixed signal, for example light. Rather, varying the signal includes changing the activated signal, and in particular in such a way that this change can also be perceived by a user. The activation and deactivation of two different light sources having signals that cannot be changed per se shall also not be considered to be understood as varying the signal or signals, since the respective output signal is not varied. In contrast, this includes activation and deactivation of different signals that, upon activation, output a changed signal, and in particular a signal that has been perceptibly changed. Varying can also be implemented by dimming a light signal, for example.

In one embodiment of the signaling device for a tennis racket, the invention functions as described.

The signaling device is preferably designed as a kind of whistle. The whistle is clamped into the tip of the racket between longitudinal strings. In the specialty field of tennis training, this whistle is used as a training aid for learning a topspin shot. Even while the game or the striking movement is in progress, direct feedback regarding the spin intensity and correct execution of the spin is provided immediately after the stroke, regardless of whether this is a forehand or backhand stroke. A direct/an immediate assessment of learning success takes place. The player independently assesses what is correct and incorrect based on the received feedback. The natural learning process by way of the "actual" to "target" value comparison is reinforced by the direct assessment of the topspin shot, based on the whistling sound. Every movement that is carried out successfully is immediately audible, and is consequently learned effectively. The correct movement pattern of the forehand or backhand topspin shot is trained by the task "Making the sound even before contact is made with the ball." Unnecessary strokes across the playing field based on an open racket position can be avoided. A sound is only made when the racket position is correct. Via the sound, the player immediately learns which sequence of movements works.

The invention can be used to learn the correct racket position. The whistle will only sound, due to the aft current flowing parallel to the striking surface, when the racket position or movement is correct. The movement provides for a center of rotation. The center of rotation is the hand on the racket grip. Accordingly, for a correct movement, the racket Up must rotate about this center of rotation. For the correct movement, the movement vector in the Y direction is crucial, when the vector in the X direction is the hitting direction (forward, parallel to the ground). With an open racket surface, no whistling sound occurs due to the incorrect movement. Only a combination of angular momentum in the Y direction and a correct racket position approximately perpendicularly, or inclined in the striking direction, generates a signal tone. This operating principle is only possible when designing the signaling device as a Helmholtz resonator. Due to the design as a Helmholtz resonator, it is possible to generate at least two different signal tones, these being whistling sounds here, as a function of the velocity of the movement, which provide feedback about the spin intensity. When used on a tennis racket, a clear, quiet whistling sound can be heard from the whistle with a slow velocity, then no clean sound until a threshold is exceeded again, and then a loud, clean sound again up to a limit. For example, in a spin range that corresponds to a ball rotation of approximately 500 rpm to 1000 rpm, a quiet first sound can be heard; a loud sound can be heard in a spin range of approximately 1500 to 3000 rpm, and thereafter no sound occurs. The benefit for the user is that the player can be deliberately kept within a range. Only in this way is it possible to challenge the player and provide important feedback. The player would not be able to differentiate constant whistling.

Further measures improving the invention are described in the dependent claims or will be apparent from the following description of at least one exemplary embodiment of the invention, which is shown schematically in the figures. All of the features and/or advantages that are apparent from the claims, the description or the drawing, including design details, arrangement in terms of space, and method steps, can be essential to the invention, both alone and in a wide variety of combinations. Identical or similar components are denoted by identical or similar reference numerals in the figures.

DETAILED DESCRIPTION OF THE INVENTION

Figure 1:
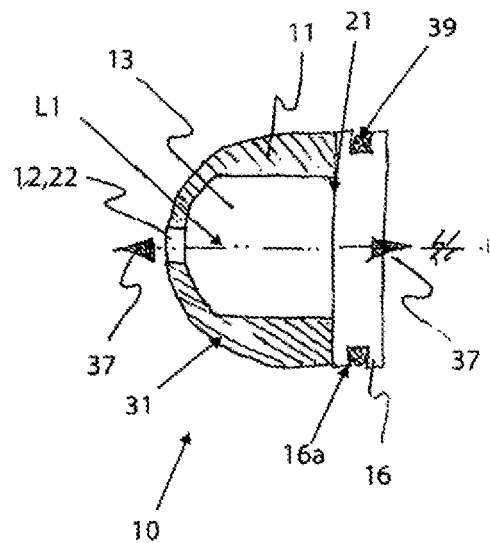
FIG. 1 schematically shows a longitudinally cut cross-sectional view of one embodiment of a signaling device.
Figure 2:
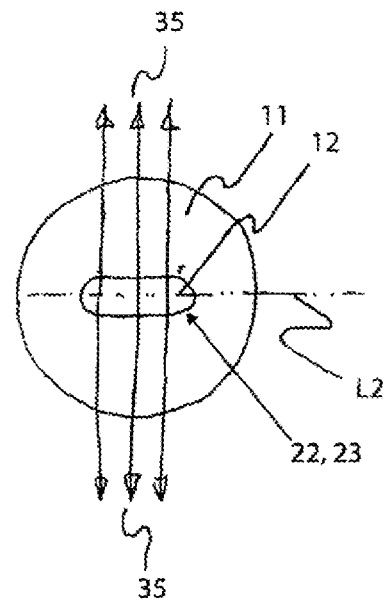
FIG. 2 schematically shows a top view onto the embodiment according to FIG. 1.

FIGS. 1 and 2 show one exemplary embodiment of the invention in different views and different levels of detail. FIG. 1 schematically shows a longitudinally cut cross-sectional view of an embodiment of a signaling device 10. FIG. 2 schematically shows a top view onto the embodiment according to FIG. 1. The signaling device 10 includes a resonant body 11. The signaling device 10 furthermore includes a holding device 16. The holding device 16 and the resonant body 11 are connected to one another in the shown embodiment. In the shown exemplary embodiment, the holding device 16 and the resonant body 11 are produced separately and are non-detachably connected to one another. By way of the holding device 16, the signaling device 10 can be attached to an implement. In the shown exemplary embodiment, the holding device 16 includes a groove 16a extending peripherally around the sides. By way of this groove, the signaling device 10 can be attached between two tennis racket strings 39, for example. The resonant body 11 has a cavity 13. This is delimited with respect to a surrounding area by the wall 31 of the resonant body 11. A (single) opening 12 is provided in the wall 31. Via this opening 12, the cavity 13 is fluidically connected to the surrounding area. The cavity 13 is delimited on one end by a bottom 21. This is designed without an opening. The holding device 16 is integrated on the bottom 21 or in the bottom 21. On another end, the opening 12 is formed. The resonant body 11 or the cavity 13 is formed in the longitudinal direction L1 between the two end sides. When held, the signaling device 10 thus protrudes more in the longitudinal direction L1 toward the opening 12, 22 than toward the other end side. The opening 10 is formed approximately centrally on the end on the resonant body 11. The resonant body 11 extends in an approximately dome-shaped manner from the bottom 12 to the other end. The resonant body 11 is rotation-symmetrical about the longitudinal axis L1. The opening 12, in contrast, is not rotation-symmetrical about the longitudinal axis L1. In the shown embodiment, the opening 12 is designed as an elongated hole 22. The longitudinal extension L2 of the elongated hole 22 is oriented transversely, and preferably perpendicularly, with respect to an air current 35 caused by a target striking movement 37. The aft current 35 takes place approximately perpendicularly to the longitudinal extension L2 of the opening 22 in one direction, or in an opposite direction, for example in the case of a tennis stroke movement during a backhand movement or a forehand movement. The cavity 13 is likewise rotation-symmetrical about the longitudinal axis L1. The cavity 13 is substantially cylindrical, including a rounded dome part adjoining the opening 12. In this way, the wall of the dome-shaped resonant body 11 is designed to be stronger in the region of the bottom 21 than in the longitudinal direction L1 in the region of the opening 12. In the longitudinal direction L1, starting at the height where the dome-shaped portion of the cavity 13 begins; the wall thickness of the resonant body 11 is approximately constant, with the exception of the opening 12.

The signaling device 10 is provided for attachment to a sports implement that can be swung through the air for the purpose of accelerating a ball, and in particular a tennis racket. The signaling device 10 includes the, preferably dome-shaped, resonant body 11, including the opening 12 designed as an elongated hole 22 and the substantially cylindrical cavity 13, by way of which an acoustic signal, and preferably a whistling sound, can be generated as a result of an air current 35 that is substantially perpendicular to the longitudinal axis L2 of the opening 12. The signaling device 10 includes a holding device 16, by way of which the resonant body 11 can be detachably attached to the sports implement so that the opening 12 extends substantially transversely to the target movement direction or target striking direction 37 of the strike carried out with the sports implement.

Figure 3:
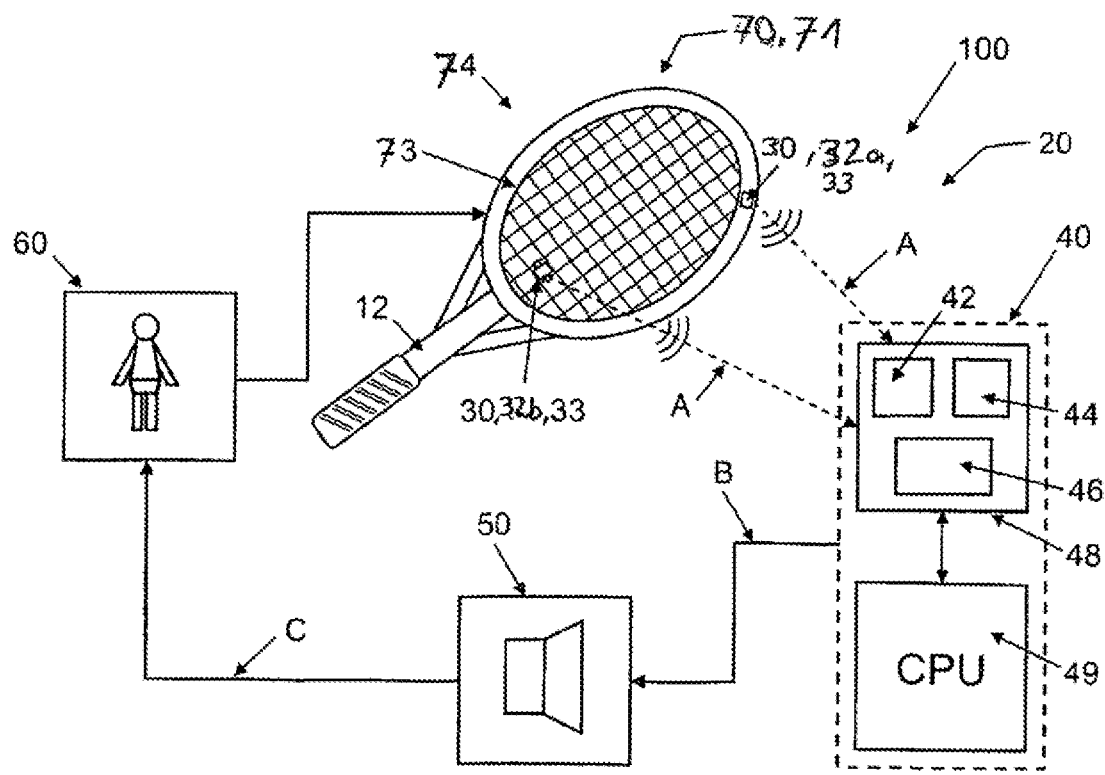
FIG. 3 schematically shows an embodiment of a system for learning and/or improving sequences of movements, and in particular for learning and/or improving body postures and/or striking movements.

FIG. 3 schematically shows an embodiment of a system 100 for learning and/or improving sequences of movements, and in particular for learning and/or improving body postures and/or striking movements. The system 100 includes a striking implement 70, here in the form of a tennis racket 71. Moreover, the system 100 includes a device 20, which includes means for learning and/or improving sequences of movements. The means comprise two sensors 30. These are disposed on the tennis racket 71 by way of example. A first sensor 32a is disposed on a racket shaft 72. A second sensor 32b is disposed in the racket frame 73 on the racket head 74. The arrangement takes place in such a way that taring of the racket 71 is not influenced, or is not significantly influenced. If necessary, taring is provided, for example in the form of counterweights, which are not shown here. Preferably, the sensors 30 are provided close to an axis of gravity of the racket 71. The sensors 30 are designed to detect a movement. For this purpose, the sensors 30 can be designed as movement sensors, acceleration sensors, inertial sensors or the like. In the present example, the sensors 30 are designed as acceleration sensors 33. The sensors 30 detect a sequence of movements of the racket 71, and thus of the sensor 30 itself. The data regarding the sequence of movements is acquired by the sensors 30 and transmitted to an evaluation unit 40 (shown by arrows A). The evaluation unit 40 includes at least one first memory area 42 and at least one second memory area 44. The first memory area 42 is designed to define a target sequence of movements and/or a permissible deviation from a target sequence of movements. These are retrievably stored in the memory 42. The second memory 44 is designed to store the actual sequence of movements to be learned or to be improved by way of the sensors 30. Furthermore, a comparison area 46 is provided. The comparison area 46 is designed to compare the actual sequence of movements with the target sequence of movements. The memory areas 42, 44 and the comparison area 46 are integrated into a component 48. Furthermore, the evaluation unit 40 includes a processing unit 49 in the shown example. This can thus be used to process the data and the comparisons, carry out a computer program, and generate corresponding signals. The processing unit 49 and the component 48 are preferably integrated into the evaluation unit 40. The evaluation unit 40 forwards a signal to an output unit 50, as is represented by the arrow B. The output unit 50 is designed as a speaker 51 in the present example. This converts the transmitted signal into a sound or a tone, or multiple sounds or tones or, in general, into an acoustic signal. This acoustic signal is forwarded to a user 60, illustrated by the arrow C. The user 60 receives the signal and adapts the sequence of movements he or she is carrying out to the received signal. When no signal sounds, no change is required, or conversely, when no signal sounds, a change is required, depending on the application. In this way, a control loop is created, in which the user 60 quickly and conveniently learns or improves a sequence of movements.

The above-described features of the invention can, of course, be used not only in the respective described combination, but also in other combinations or alone, without departing from the scope of the present invention.

LIST OF REFERENCE NUMERALS 10 signaling device
11 resonant body
12 opening
13 cavity
16 holding device
16a groove
21 bottom
22 elongated hole
31 wall
35 air current
37 target striking direction
39 tennis racket string
L1 longitudinal direction
L2 longitudinal extension
70 striking implement
71 tennis racket
72 racket shaft
73 racket frame
74 racket head
20 device
30 sensor
32a first sensor
32b second sensor
33 acceleration sensor
40 evaluation unit
42 first memory area
44 second memory area
46 comparison area
48 component
49 processing unit
50 output unit
60 user
100 system A arrow A (transmission)
B arrow B (signal forwarding)
C arrow C (signal forwarding)

The invention claimed is:

1. A signaling device for generating signals during an actual sequence of movements of the signaling device, the signaling device comprising:
a resonant body including:
a cavity for generating an acoustic signal during a movement, and
a single opening which has a fluidic operative connection to the cavity and by way of which the cavity is fluidically connected to a surrounding area,
wherein the signaling device is configured to output at least one signal as a function of the actual sequence of movements, wherein the signaling device is configured so that an output of the signal takes place during the sequence of movements so that feedback regarding the actual sequence of movements may take place even during the sequence of movements, and/or wherein the signaling device is configured so that the output signal varies as a function of the actual movement, at least with respect to the intensity, time and/or frequency.

2. The signaling device according to claim 1, comprising a holding device, wherein the resonant body and the holding device are configured to be connected to one another, or connectable to one another, so as to attach the resonant body by way of the holding device to a striking implement.

3. An implement or a piece of clothing for carrying out a movement, the implement comprising a tennis racket, a golf club, a table tennis paddle, or a baseball bat, and the piece of clothing comprising sports underwear, or a jersey, wherein the implement or the piece of clothing comprises at least one signaling device according to claim 1.

4. A device for learning and/or improving body postures and/or striking movements, comprising at least one signaling device according to claim 1.

5. The device according to claim 3, comprising:
at least one sensor for detecting at least a portion of a movement (actual or target, or both);
at least one memory area for defining a target sequence of movements and/or a permissible deviation from a target sequence of movements;
at least one memory area for storing the actual sequence of movements to be learned or to be improved by way of the at least one sensor; and
at least one comparison area for comparing the actual sequence of movements to the target sequence of movements,
wherein the signaling device is configured as an output unit for outputting at least one signal as a function of a deviation of the actual sequence of movements from the target sequence of movements, wherein the output unit and/or the areas are designed so that output of the signal takes place during the sequence of movements so that feedback regarding the actual sequence of movements may take place even during the sequence of movements, and/or wherein the output unit and/or the areas are designed so that the output signal varies as a function of a deviation of the actual sequence of movements from the target sequence of movements, at least with respect to the intensity, time and/or frequency.

6. The device according to claim 5, wherein the device furthermore comprises an implement and/or a piece of clothing.

7. A method for learning and/or improving (actual) sequences of movements for learning and/or improving body postures and/or striking movements, comprising the following steps:

provide at least one signaling device according to claim 1; and outputting at least one signal as a function of the actual sequence of movements, wherein an output of the signal takes place during the sequence of movements so that feedback regarding the actual sequence of movements may take place even during the sequence of movements, and/or wherein the output signal is varied as a function of the actual movement, at least with respect to the intensity, time and/or frequency, and/or providing a sensor for detecting at least a portion of a movement;

defining a target sequence of movements and/or a permissible deviation from a target sequence of movements;

detecting the actual sequence of movements to be learned or to be improved by way of the at least one sensor;

comparing the actual sequence of movements to the target sequence of movements; and outputting at least one signal as a function of a deviation of the actual sequence of movements from the target sequence of movements, wherein the output of the signal takes place during the sequence of movements so that feedback regarding the actual sequence of movements may take place even during the sequence of movements, and/or wherein the output signal varies as a function of a deviation of the actual sequence of movements from the target sequence of movements, at least with respect to the intensity, time and/or frequency.

8. A computer program product, comprising program code means stored on a non-transitory computer-readable medium for carrying out the method according to claim 7 when the program runs on a computer.

9. A system for learning and/or improving body postures and/or striking movements, comprising a signaling device according to claim 1, wherein the sequence of movements that is carried out is detected by way of a sensor provided on either a striking implement, including either a tennis racket, a golf club or another sports striking apparatus or sports implement, or on a piece of clothing or a user, and an acoustic signal generated as a function of the sequence of movements detected by way of the sensor is output during the sequence of movements, so that auditory reafferences are made available, which can then be utilized as online feedback.

* * * * *